United States Patent
Weinberg et al.

(10) Patent No.: US 11,320,535 B2
(45) Date of Patent: May 3, 2022

(54) OPTICAL SYSTEM FOR DETERMINING INTERFERER LOCUS AMONG TWO OR MORE REGIONS OF A TRANSMISSIVE LIQUID CRYSTAL STRUCTURE

(71) Applicant: Analog Devices, Inc., Norwood, MA (US)

(72) Inventors: Harvey Weinberg, Sharon, MA (US); Boris Lerner, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 425 days.

(21) Appl. No.: 16/393,310

(22) Filed: Apr. 24, 2019

(65) Prior Publication Data
US 2020/0341143 A1    Oct. 29, 2020

(51) Int. Cl.
*G01S 17/04* (2020.01)
*G02B 27/09* (2006.01)
(Continued)

(52) U.S. Cl.
CPC .......... *G01S 17/04* (2020.01); *G02B 27/0977* (2013.01); *G02B 27/1046* (2013.01); *H04N 5/2353* (2013.01)

(58) Field of Classification Search
CPC ....... G01S 17/04; G01S 7/4816; G02B 13/16; G02B 26/02; G02B 27/0977; G02B 27/1046; H04N 5/2353
(Continued)

(56) References Cited

U.S. PATENT DOCUMENTS 4,887,121 A * 12/1989 Pritchard ............. H04N 5/2351
                                                   396/225
6,282,309 B1     8/2001 Emery
(Continued)

FOREIGN PATENT DOCUMENTS

WO    WO-2014081478 A1    5/2014
WO    WO-2017112416 A1    6/2017

OTHER PUBLICATIONS

Chevalier, Tomas R., et al., "Laser radar modeling for simulation and performance evaluation", Proc. SPIE 7482, Electro-Optical Remote Sensing, Photonic Technologies, and Applications III, (Sep. 2009), 13 pgs.
(Continued)

*Primary Examiner* — Que Tan Le
(74) *Attorney, Agent, or Firm* — Schwegman Lundberg & Woessner, P.A.

(57) ABSTRACT

In an optical detection system, received light can be concentrated and presented to a single-pixel photodetector (or an array of relatively few photodetectors). Concentration of received light can be performed by curved concentrator such as a continuously-curved or faceted reflector. A portion or an entirety of the detector might be blinded (e.g., desensitized) by bright interferers such as the sun. An electro-optic shutter such as a liquid crystal (LC) structure can be used to selectively transmit or mask-off portions of the received light. For example, an LC structure can have regions of selectable opacity for a specified polarization of incident light. The LC structure can be controlled to render certain region opaque, such as to suppress interference from unwanted interferers such as the sun, bright lights, or unwanted reflections. An LC structure can also be used to implement a scanned transmit/receive technique.

20 Claims, 7 Drawing Sheets

(51) Int. Cl.
*H04N 5/235* (2006.01)
*G02B 27/10* (2006.01)

(58) Field of Classification Search
USPC ...................................... 250/221.214 R, 216
See application file for complete search history.

(56) References Cited

U.S. PATENT DOCUMENTS

| | | |
|---|---|---|
| 6,844,924 B2 | 1/2005 | Ruff et al. |
| 7,049,945 B2 | 5/2006 | Breed et al. |
| 7,532,311 B2 | 5/2009 | Henderson et al. |
| 7,570,320 B1 | 8/2009 | Anderson et al. |
| 7,652,752 B2 | 1/2010 | Fetzer et al. |
| 7,688,347 B2 | 3/2010 | Dolgoff |
| 8,311,372 B2 | 11/2012 | Anderson et al. |
| 8,380,025 B2 | 2/2013 | Anderson et al. |
| 8,463,080 B1 | 6/2013 | Anderson et al. |
| 8,860,897 B1 | 10/2014 | Anderson et al. |
| 9,170,333 B2 | 10/2015 | Mheen et al. |
| 9,325,947 B2 | 4/2016 | Bridge et al. |
| 9,366,938 B1 | 6/2016 | Anderson et al. |
| 9,528,819 B2 | 12/2016 | Herschbach |
| 9,829,766 B2 | 11/2017 | Anderson et al. |
| 9,841,495 B2 | 12/2017 | Campbell et al. |
| 9,880,443 B2 | 1/2018 | Anderson |
| 9,885,892 B2 | 2/2018 | Anderson et al. |
| 10,031,214 B2 | 7/2018 | Rosenzweig et al. |
| 10,120,261 B2 | 11/2018 | Ziemkiewicz et al. |
| 10,133,083 B1 | 11/2018 | Ziemkiewicz et al. |
| 2015/0309175 A1 | 10/2015 | Hinderling et al. |

OTHER PUBLICATIONS

Powers, Michael A., et al., "Spectral LADAR: active range-resolved three-dimensional imaging spectroscopy", Applied Optics, vol. 51, Issue 10, (Mar. 2012), 11 pgs.

\* cited by examiner

OPTICAL SYSTEM FOR DETERMINING INTERFERER LOCUS AMONG TWO OR MORE REGIONS OF A TRANSMISSIVE LIQUID CRYSTAL STRUCTURE

FIELD OF THE DISCLOSURE

This document pertains generally, but not by way of limitation, to apparatus and techniques that can be used for concentrating and detecting scattered or reflected light, such as for use in a system for performing Light Detection and Ranging (LIDAR) or other optical detection.

BACKGROUND

An optical detection system, such as a system for providing light detection and ranging (LIDAR), generally includes a light source (e.g., an illuminator) and an optical receiver. Various schemes can be used to provide illumination of a field-of-regard (FOR), such as a flash technique in which a large portion or an entirety of the of the field-of-regard is illuminated contemporaneously. In another approach, scanning can be used to selectively illuminate portions of the field-of-regard. Such scanning can include use of one or more mechanical actuators such as rotating or oscillating mirrors or prism structures to orient a beam of light toward specified portions of the field-of-regard. In yet another approach, a non-mechanical beam-steering technique can be used, either alone or in combination with a mechanically-scanned technique.

In one approach, detection of scattered or reflected light can be performed using an array of photodetectors, such as to image a field-of-view (FOV) corresponding to the field-of-regard illuminated by the light source. A time-of-flight determination can be made to estimate a distance to an object or target imaged in the field-of-view. Optical detection systems such as LIDAR can be applied in vehicular applications, such as to facilitate operation of autonomous vehicles. Other applications can include short range sensing for indoor environments, or beam guidance to facilitate communication or tracking of an object, for example.

SUMMARY OF THE DISCLOSURE

An optical detection system generally includes an optical transmitter and an optical receiver. The optical transmitter can include an illuminator module. For example, in a scanned transmit approach, the illuminator module can establish an output beam such as a spot or a line that can be mechanically or electro-optically steered to various locations (e.g., angular positions) to illuminate a field-of-regard (FOR). The optical receiver can capture light that is scattered by or reflected off one or more objects within a receiver field-of-view (FOV).

The present inventors have recognized, among other things, that the optical receiver can be simplified if fewer photo-sensitive elements are used. For example, a count of as few as a single photodetector (e.g., a single photodiode corresponding to a single pixel) can be used to provide optical detection. However, use of an optical detection scheme where a single photodetector or relatively few photodetectors are used can present challenges. For example, the present inventors have also recognized that when received light from the FOV is concentrated and presented to a single photodetector (or relatively few photodetectors), a portion or an entirety of the detector might be blinded (e.g., desensitized) by bright interferers such as the sun, when present in the FOV being observed. The present inventors have also recognized that to help address such interferers, an electro-optic shutter such as a liquid crystal (LC) structure can be used to selectively transmit or mask-off portions of the received light. For example, an LC structure can have regions of selectable opacity for a specified polarization of incident light. The LC structure can be controlled to render a certain region opaque, such as to suppress interference from unwanted interferers such as the sun, bright lights, or unwanted reflections. An LC structure can also be used to implement a scanned transmit/receive technique, as shown and described herein.

The present inventors have also recognized that concentrating the light received from the FOV into a relatively small area can also present challenges. In an illustrative example, a curved reflector such as a continuously-curved or faceted reflector can be used to concentrate received light and convey such light to a photodetector. In this manner, unwanted losses can be suppressed and a spatially compact optical receive path can be implemented.

In an example, an optical detection system can be used in receiving light scattered or reflected from a field of view to aid in identifying one or more of a presence of, or a range to, an object, the optical detection system comprising a photodetector, a concentrator to convey the scattered or reflected light to the photodetector, and a transmissive liquid crystal (LC) structure coupled to a control circuit, the transmissive liquid crystal structure comprising two or more regions having a selectable opacity, the regions adjustable by the control circuit. In an example, the concentrator comprises a parabolic reflector. In an example, the photodetector comprises a single-pixel photodetector.

In an example, a technique such as a method can include using an optical detection system to receive light scattered or reflected from a field of view to aid in identifying one or more of a presence of, or a range to, an object, the method comprising conveying scattered or reflected light to a photodetector using a concentrator, and shuttering at least a portion of the field of view using a transmissive liquid crystal (LC) structure coupled to a control circuit, the transmissive liquid crystal structure comprising two or more regions having a selectable opacity, the regions adjustable by the control circuit. In an example, the method can include automatically determining a locus amongst the two or more regions of the transmissive LC structure corresponding to an interferer within the field of view, and rendering one or more regions corresponding to the locus opaque using the transmissive LC structure. In an example, the method can include searching for the interferer by rendering opaque one or more regions amongst the two or more regions and, in response, monitoring the output of the photodetector. In an example, the method can include generating illumination comprising a one-dimensional (1D) line oriented along a first axis, scanning the one-dimensional line along a second axis, perpendicular to the first axis, and adjusting the transmissive LC structure to establish a linear transmissive region oriented parallel to the second axis. In an example, the method can include establishing a series of parallel transmissive regions oriented parallel to the second axis to effect a pixel-by-pixel scan of the field of view using a combination of the 1D transmitted line and respective parallel transmissive regions.

Generally, the examples described in this document can be implemented in whole or in part within an optical receiver assembly or an optical transceiver assembly. Such a transceiver assembly can include an optical transmitter and an optical receiver, along with support circuitry, such as power supply or power conditioning circuitry. The transmitter can include a beam-steerer, such as an electro-mechanical beam-steerer comprising a micro-electromechanical system (MEMS) device including an array of mirrors. In another example, the beam-steerer can include a liquid-crystal waveguide (LCW) beam-steering device, as described in other examples herein. In yet another example, a beam-steerer can include an optical phased-array emitter.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An optical detection system can be used to detect objects such as obstacles. Such detection can include identifying one or more of a distance from the optical system, a spatial location of an object, or an extent of such an object. As mentioned elsewhere herein, various approaches can be used to perform such detection, including illuminating a field-of-regard using either a "flash" or scanned optical transmitter scheme, or combinations thereof. Light that is reflected or scattered by objects in the field-of-regard can be detected and then processed, such as converted to an electrical signal, amplified, filtered, and digitized for processing. Such processing can include use of a time-to-digital (TDC) estimation technique.

Apparatus and techniques described herein can be used to provide an optical receiver that can suppress interference from objects in a field-of-view (FOV) other than an object of interest. For example, the apparatus and techniques described herein can be used to "mask" a bright interferer, such as the sun, using an electro-optical shutter. In this manner, if relatively few photodetectors are used (such as single a photodetector), the shuttering can inhibit or suppress desensitization or blinding of the detector by an interferer. Spatial-selectivity can be achieved by using a scanned illumination source, or by spatially masking (e.g., rendering opaque) certain regions of the shutter, or by using a combination of transmit scanning and such masking. Light reflected or scattered by an object in the field-of-view of the receiver can be conveyed to a photodetector using a concentrator, such as a continuously-curved mirror or a faceted reflecting structure, as illustrative examples.

Figure 1A:
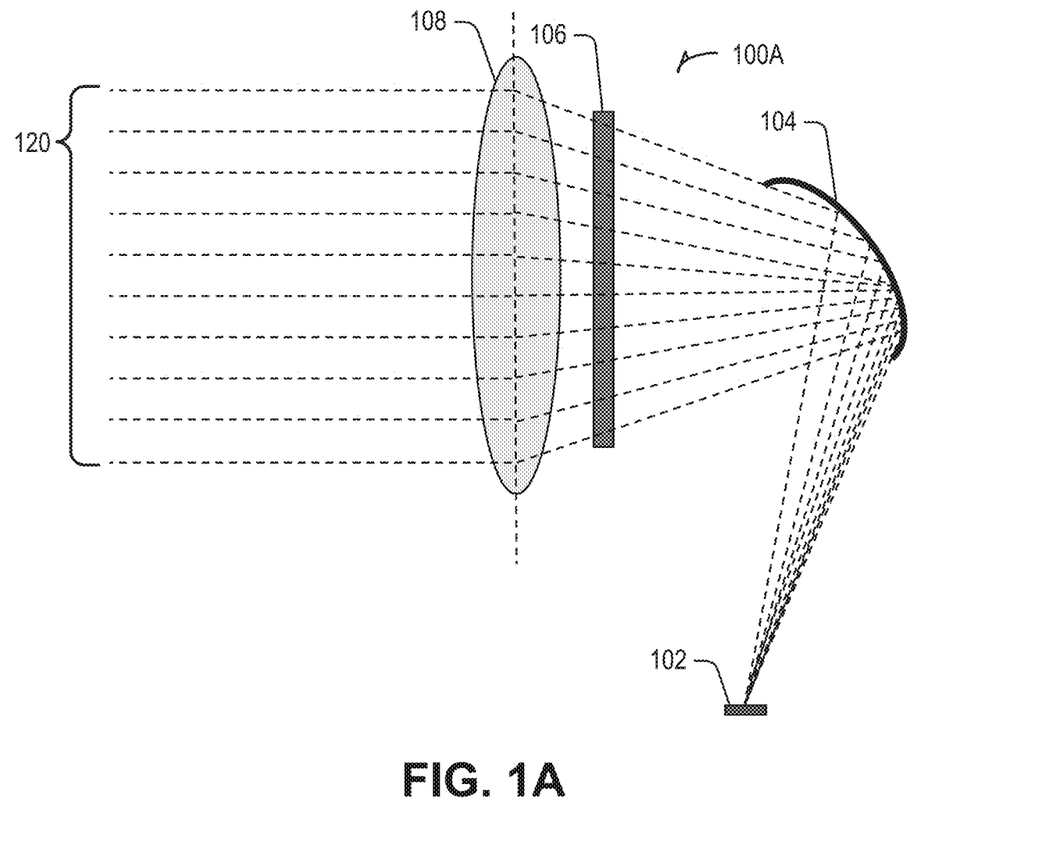
FIG. 1A illustrates generally an example comprising an optical receive scheme, such as can be used as a portion of an optical detection system.
Figure 1B:
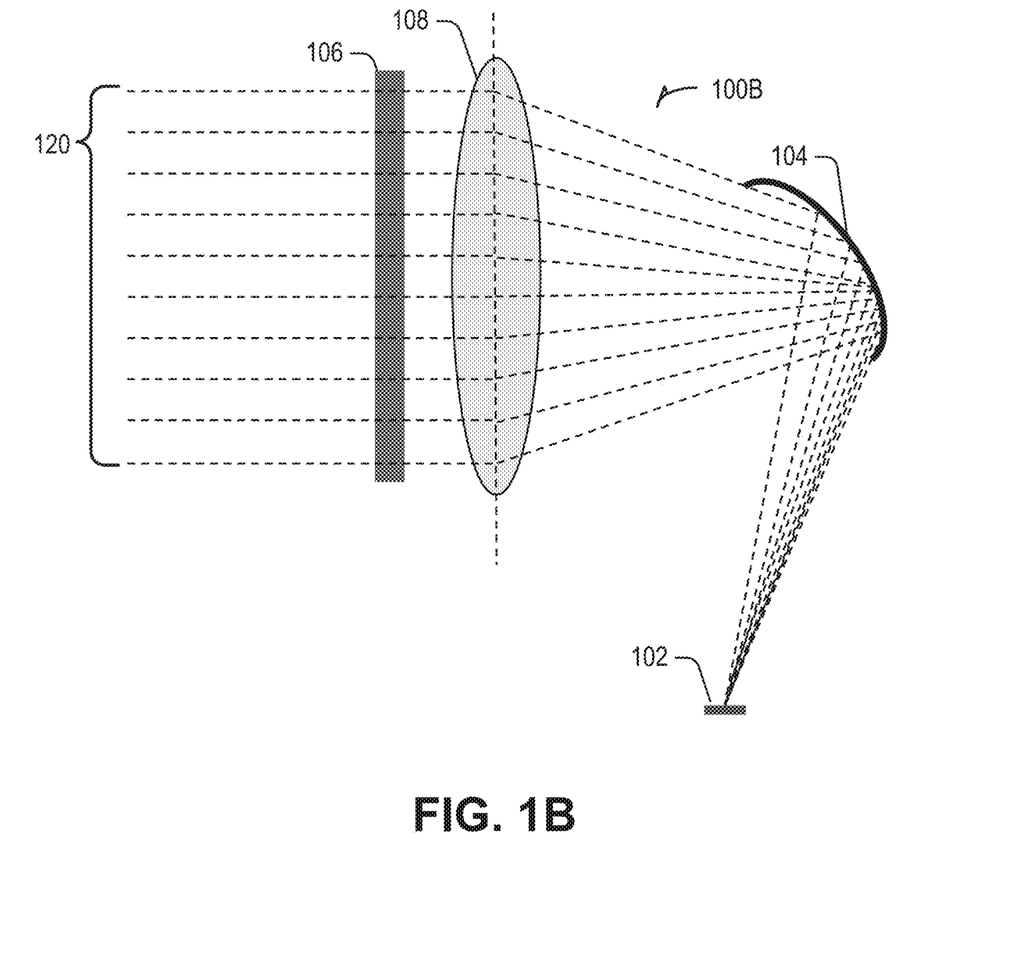
FIG. 1B illustrates generally another example comprising an optical receive scheme.

FIG. 1A illustrates generally an example 100A comprising an optical receive scheme, such as can be used as a portion of an optical detection system and FIG. 1B illustrates generally another example 100B comprising an optical receive scheme. In an optical detection system, a field-of-regard can be illuminated by a light source. Such a light source can include one or more solid-state devices, such as a diode laser or an array of such devices. Illustrative examples of illumination light sources include lasers having a Master Oscillator Power Amplifier (MOPA) architecture, a Slab-Coupled Optical Waveguide Laser (SCOWL), or a Diode-Pumped Solid-State Laser (DPSSL). Other device architectures can be used, such as a vertical-cavity surface-emitting laser (VCSEL). In an illustrative example, the illuminator can generate light in a short-wave infrared (SWIR) wavelength band (e.g., from about 1400 nanometers to about 1600 nm), According to various examples, a "flash" scheme can be used where a portion or an entirety of the field-of-regard is illuminated contemporaneously and then imaged by an optical receiver. In another approach, a scanned transmit scheme can be used where a spot or a line generated by a transmitter is steered to various locations in the field-of-regard.

Objects in the field of regard can scatter or reflect the transmitted light, and such scattered or reflected light can be detected by an optical receiver. A time-of-flight can be determined between triggering of illumination of the object and an instant corresponding to receipt of scattered or reflected light from the object. Such a time-of-flight can be used to establish a distance estimate to the object from the optical detection system. Generally, an angular field observed by the optical receiver can be referred to as a field-of-view (FOV). The FOV generally overlaps with the field-of-regard illuminated by the transmitter, but the two need not have the same shape or spatial extent. If the receiver is located in a different location with respect to the transmitter, the transmit/receive configuration can be referred to as a bistatic configuration. If the receiver is located in the same location as the transmitter, the transmit/receive configuration can be referred to as a monostatic configuration. If the receiver is arranged to provide a field-of-view along an axis that is nearby a corresponding axis of the transmitter field-of-regard, the configuration can be referred to as a biaxial monostatic configuration. The examples 100A and 100B of FIG. 1A and FIG. 1B are applicable to either monostatic or bistatic transmit/receive configurations. Generally, an array of photodetectors may be used such as to rapidly image a portion or an entirety of a field-of-view without requiring scanning. However, the present inventors have recognized that a receive scheme can be simplified if fewer photodetectors are used (including a count of as few as a single photodetector providing a single imaging pixel).

In the examples 100A and 100B of FIG. 1A and FIG. 1B, an optical sensor 102 can receive light conveyed by a concentrator 104 (e.g., a reflecting concentrator). The curved reflecting concentrator 104 can receive light from an imaging optic 108 such as a converging transmissive lens or other optical structure. In this manner, a broad field of incident light 120 can be concentrated and conveyed to the optical sensor 102, such as incident light 120 corresponding to an aperture wider than the sensing aperture of the optical sensor 102. Use of a reflecting concentrator 104 can include use of a curved mirror such as having a continuously-curved parabolic shape. In another example, the mirror can be subdivided into faceted segments, such as arranged to follow a curved contour. In yet another example, the faceted segments can be curved, individually. A capacitance of the optical sensor 102 is generally dependent upon an area of the optical sensor 102. Use of a curved reflecting concentrator 104 allows a photodetector to be used having an aperture smaller than that corresponding to the incident light 120. Accordingly, a desired field-of-view can be observed while controlling or limiting the optical sensor 102 capacitance. Such a capacitance can be related to a rate at which the optical sensor 102 can be monitored, such as impacting an overall achievable frame rate or sensitivity of the optical receive chain.

The optical sensor 102 can include an array such as a one-dimensional or two-dimensional array of photodetectors, or even a single photodetector. For example, for detection of wavelengths longer than about 1000 nanometers, such as a wavelength of about 1500 nanometers, an Indium Gallium Arsenide (InGaAs) photodetector can be used as the optical sensor 102. The optical sensor 102 can include a single-pixel InGaAs photodetector, such as coupled to a transimpedance amplifier (TIA). If an optical sensor 102 having relatively few pixels or even a single-pixel arrangement is used, such an optical sensor 102 can be sensitive to interferers comprising light sources or unwanted reflectors contributing to the received light 120. Such interferes can include the sun itself, terrestrial lights such as street lamps or headlights in the field-of-view, or objects reflecting light from such sources. Generally, as a count of pixel of the optical sensor 102 is reduced, a proportion of the field-of-view that is rendered blind by the interferer increases.

An electro-optical shutter such as a transmissive liquid crystal (LC) structure 106 can be used to inhibit or suppress interference at the optical sensor 102. In the example of FIG. 1A, the LC structure 106 can be located before focusing or relay optics such as upstream of the imaging optic 108 and the reflecting concentrator 104. In the example of FIG. 1B, the LC structure 106 can be located after focusing or relay optics such as downstream of the imaging optic 108. Other configurations can be used such as placing the LC structure 106 along the optical receive path in a manner allowing the LC structure 106 to provide a stop or masking behavior. As an illustrative example of a mechanical configuration and materials that may be used to provide an LC shutter, THORLABS (Newton, N.J., United States of America) provides LC shutter devices to shutter an entire field incident upon an optical imager. The LC structure 106 can include two or more regions having a selectable opacity, as mentioned in relation to other examples described herein. Other optics can be included in the optical receive pathway, such as to selectively attenuate light having an unwanted polarization or to adjust a polarization of received light 120 to facilitate shuttering by the transmissive LC structure 106.

Figure 2A:
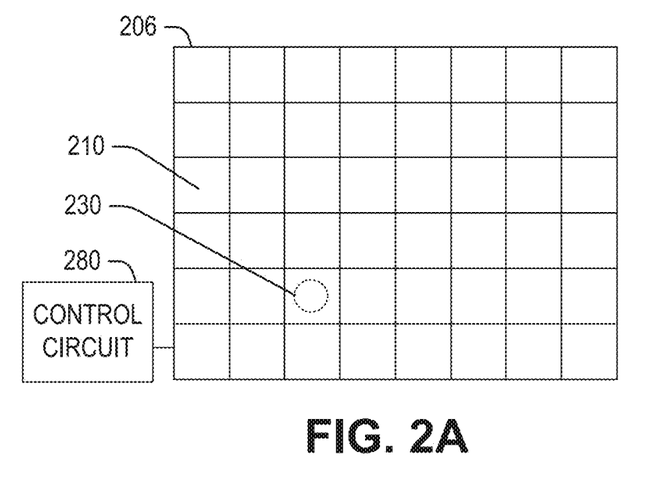
FIG. 2A and FIG. 2B show illustrative examples of an electro-optic shutter comprising regions of selectable opacity.
Figure 2B:
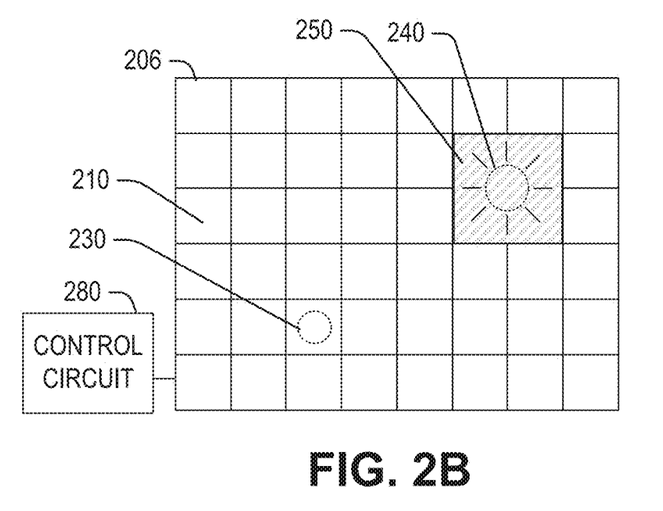

FIG. 2A and FIG. 2B show illustrative examples of an electro-optic (EO) shutter 206 (e.g., a transmissive liquid-crystal (LC) structure) comprising regions of selectable opacity. Generally, the EO shutter can define pixels such as a pixel 210, that can be rendered transmissive or opaque to light having a specified polarization. Incident light reflected or scattered by an object 230 within a field-of-view defined by the EO shutter 206 can be conveyed to an optical sensor, such as for use in a time-of-flight determination for distance estimation. The EO shutter 206 can be controlled by a control circuit 280 (e.g., a circuit comprising or coupled to a microcontroller or microprocessor and a memory circuit), and the EO shutter 206 can be included as a portion of an optical receiver as shown and described in relation to other examples (e.g., FIG. 1A and FIG. 1B). The control circuit 280 can selectively control the EO shutter 206 to render portions of the EO shutter 206 opaque by toggling one or more pixel states. For example, as shown in FIG. 2B, if a bright interferer such as the sun 240 is within a field-of-view, the EO shutter 206 can be controlled to render a region 250 defined by one or more pixels optically opaque (e.g., attenuating or entirely suppressing transmission of light associated with the interferer), such as to suppress or inhibit interference, while permitting detection of light scattered or reflected by the object 230. Various techniques can be used to select which portions (e.g., a locus) of the EO shutter 206 to be rendered opaque. For example, a pixel-by-pixel search can be conducted by sequentially or randomly toggling individual pixels from transmissive to opaque states. In an example, such a search can be implemented using specified patterns until an opaque region corresponding to the interferer is localized. Examples of such search techniques include successive approximation techniques, sequential searching, random or pseudo-random techniques, or use of a quadtree or other similar approach.

Figure 3A:
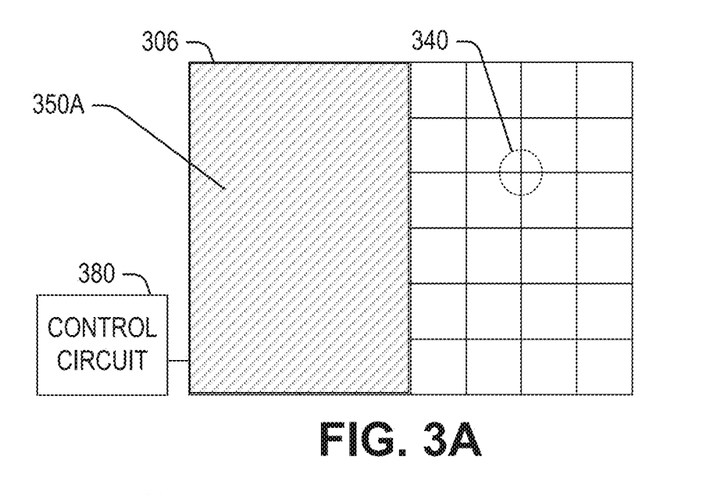
FIG. 3A, FIG. 3B, and FIG. 3C show illustrative examples of various states of an electro-optic shutter, such as corresponding to implementation of a search technique.
Figure 3B:
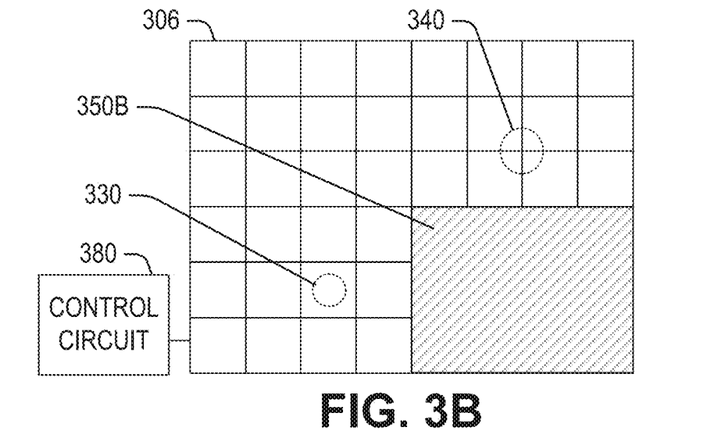
Figure 3C:
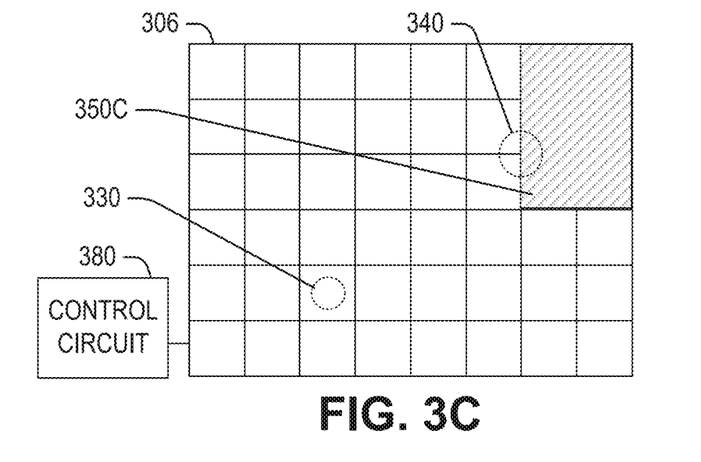

For example, FIG. 3A, FIG. 3B, and FIG. 3C show illustrative examples of various states of an electro-optic shutter 306, such as corresponding to implementation of a search technique, such as a quadtree technique. As in other examples, the EO shutter 306 can be controlled by a control circuit 380, such as triggered in coordination with an optical transmitter to perform optical detection. In FIG. 3A, a first iteration of a search technique, such as a quadtree search, can include bisecting the EO shutter 306 into an opaque region 350A and a transmissive region. If the interfering object 340 is not suppressed during the first iteration (such as indicated by a signal from an optical sensor receiving the field-of-view through the transmissive EO shutter 306, then at FIG. 3B, the state of the EO shutter 306 can be modified to provide a second iteration where a remaining portion of the EO shutter 306 is again bisected to provide another opaque region 350B. Now, an object 330 of interest may be visible, but the interfering object 340 is still present. At FIG. 3C, yet another state can be established where yet another region 3500 can be rendered opaque, such as by again bisecting a remaining portion of the EO shutter 306 that was transmissive during the prior iteration. Now, the interfering object 340 is at least partially attenuated by the opaque region 350C.

The search technique can be tailored to avoid inadvertently suppressing transmission of light from the object of interest 330, such as by using a threshold determination or other technique to process an optical signal from the optical sensor. For example, a threshold can be established indicative of saturation or near-saturation of the optical sensor and a search can be guided by determining when remaining light falls below the threshold for a particular EO shutter 306 state, indicating that interference by the brighter interfering object 340 has been suppressed.

Figure 4:
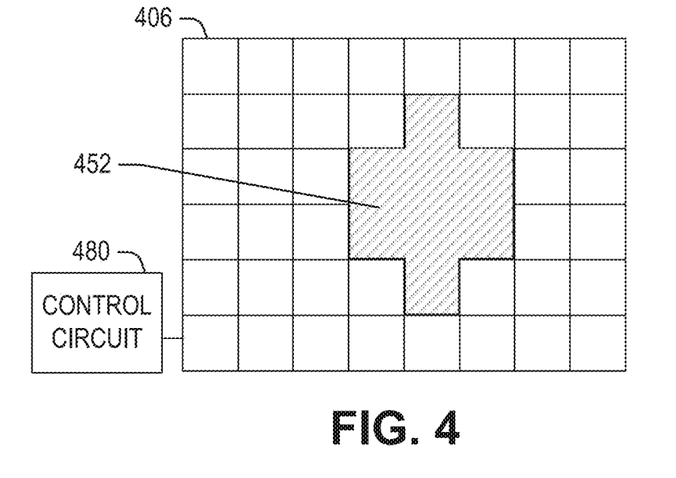
FIG. 4 shows an illustrative example of a state of an electro-optic shutter, such as corresponding to a shape mask.

If the interfering object 340 is not entirely contained within the locus of an opaque region after execution of the search (as shown in FIG. 3C), other techniques can be used to augment the quadtree approach. For example, a remaining group of pixels can be toggled sequentially to mask off the remaining portions of the interfering object 340 if not previously fully contained. In another approach, a shape mask can be used. For example, FIG. 4 shows an illustrative example of a state of an electro-optic shutter 406, such as establishing an opaque region defining a shape mask 452. Use of a shape mask 452 can help to better fit an opaque region defined by the shape mask 452 with a corresponding interferer. For example, if the interferer is circular, a corresponding shape mask can be used to approximate a circular projection (or other shape) in the plane of the EO shutter 406.

Figure 5:
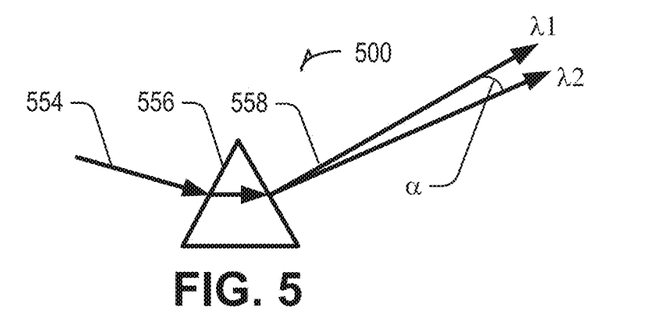
FIG. 5 illustrates generally an example comprising a transmit beam steering technique, such as can be implemented using a prism and a variable-wavelength light source.

Various examples described herein mention use of an electro-optic shutter, such as a multi-pixel transmissive LC panel, to suppress or inhibit interference by a bright object. Such an electro-optic shutter can also be used to facilitate scanning of a field-of-view, such as in combination with a scanned transmit approach or a flash illumination scheme. In a scanned transmit approach, use of a beam-steerer can facilitate steering or scanning of the beam in one or two dimensions. For example, the beam can be scanned according to a raster pattern or other arbitrary pattern according to beam-steering control signals provided to a beam-steerer. In an illustrative example, a liquid-crystal waveguide (LCW) structure can be used for beam-steering. Illustrative (but non-limiting) examples of waveguide structures can be found in (1) U.S. Pat. No. 10,133,083; (2) U.S. Pat. No. 10,120,261; (3) U.S. Pat. Nos. 9,366,938, 9,885,892, 9,829,766, and 9,880,443; (4) U.S. Pat. Nos. 8,311,372 and 8,380,025; (5) U.S. Pat. No. 8,860,897; (6) U.S. Pat. No. 8,463,080; and (7) U.S. Pat. No. 7,570,320, all of which are incorporated herein by reference in their entireties, including for their description of LCWs and uses such as for beam-steering of light, including in-plane and out-of-plane beam-steering. As another illustrative example, FIG. 5 illustrates generally an exampling comprising a transmit beam steering technique 500, such as can be implemented using a prism 556 and a variable-wavelength light source (e.g., a tunable wavelength laser). In the example of FIG. 5, an incident beam 554 can define a spot or a line that is refracted by the prism 556 to provide an output beam 558 having a specified angle of deflection that depends on the incident beam 554 wavelength. A change in wavelength from a first wavelength $\lambda 1$ to a second wavelength $\lambda 2$ can produce a corresponding angular deflection, "$\alpha$" to steer the output beam 558.

Figure 6A:
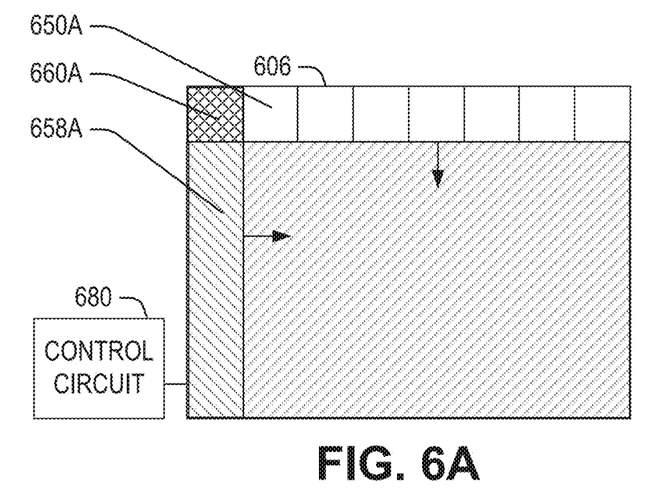
FIG. 6A, FIG. 6B, and FIG. 6C show illustrative examples of various states of a transmit/receive scheme in which a transmit line can be steered along a first axis, and an electro-optic shutter can establish a transmissive portion (e.g., a row) that can be moved along a second axis that is perpendicular to the first axis.
Figure 6B:
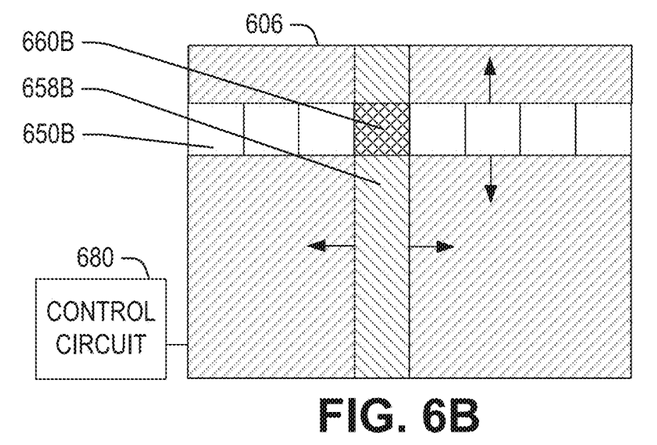
Figure 6C:
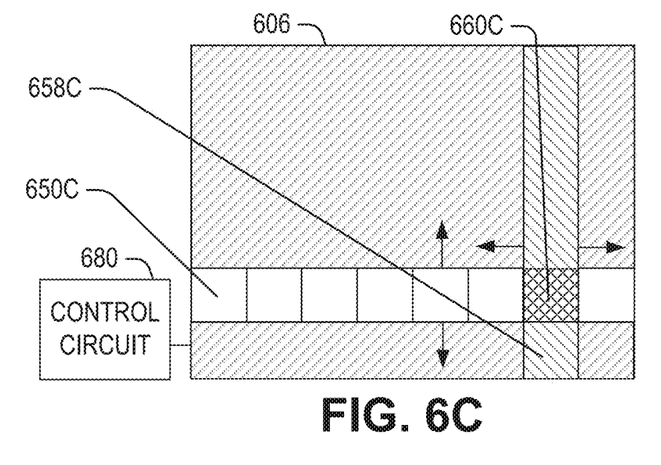

FIG. 6A, FIG. 6B, and FIG. 6C show illustrative examples of various states of a transmit/receive scheme in which a transmit line can be steered along a first axis (such as using a configuration for a beam steerer as discussed in relation to FIG. 5), and an electro-optic shutter can establish a transmissive portion (e.g., a row) that can be moved along a second axis that is perpendicular to the first axis. In the examples of FIG. 6A, FIG. 6B, and FIG. 6C, pixel-level scanning of the field-of-view can be performed. For example, in FIG. 6A, the EO shutter 606 can be controlled by a control circuit 680 to provide a transmissive row of pixels 650A and can be rendered opaque elsewhere. A line 658A corresponding to a line output of the illuminator can be scanned to provide information from the field-of-view across the row of pixels 650A. For example, in the state shown in FIG. 6A, a first pixel 660A can be interrogated because the transmissive row 650A and the line 658A intersect at the first pixel 660A. Similarly, in FIG. 6B, a second row of pixels 650B can be rendered transmissive, and the line 658B can again be scanned laterally to obtain light from pixels across the field-of-view corresponding to second row of pixels 650B, with a location corresponding to a second pixel 660B being interrogated in the state shown in FIG. 6B. At FIG. 6C, yet another state of the EO shutter 606 is shown, with a third row of pixels 650C set as transmissive, and the line 658C again scanned laterally, such as to provide interrogation of a third pixel 660C in the state shown in FIG. 6C. The technique shown in the illustrations of FIG. 6A, FIG. 6B, and FIG. 6C can be combined with other examples herein. For example, if an interfering object location has been determined or detected, pixels in the EO shutter 606 can be held opaque even if they would otherwise have been rendered transmissive according to the scanning technique. The relative orientations of the lines 658A, 658B, and 658C with respect to the rows 650A, 650B, and 650C are merely illustrative and other orientations or shapes can be used. For example, the lines 658A, 658B, and 658C could be horizontal and the transmissive rows 650A, 650B, and 650C could be oriented vertically as compared to the orientations shown illustratively in FIG. 6A, FIG. 6B, and FIG. 6C.

Figure 7:
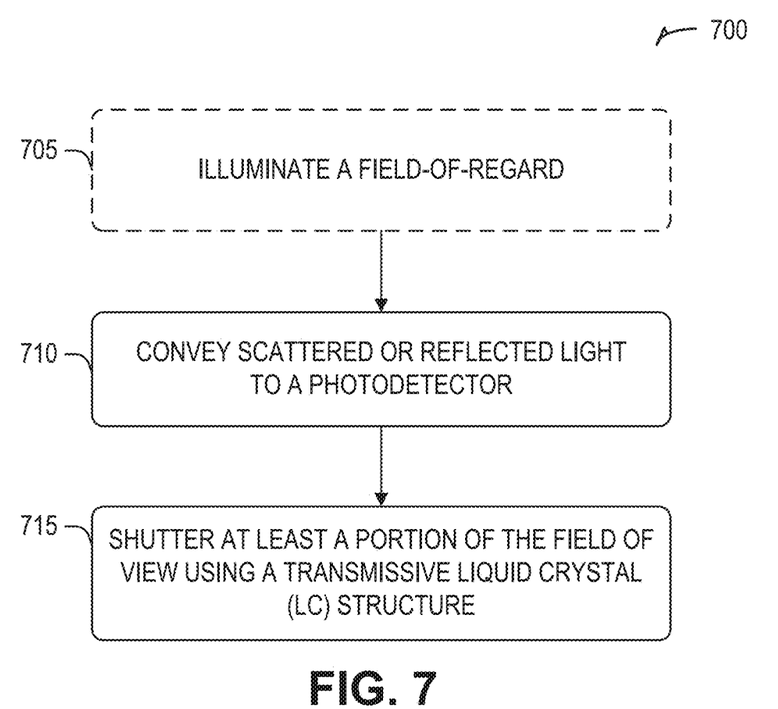
FIG. 7 illustrates generally a technique, such as a method, comprising conveying scattered or reflected light to a photodetector, and shuttering at least a portion of the field of view using a transmissive liquid crystal (LC) structure.

FIG. 7 illustrates generally a technique 700, such as a method, comprising conveying scattered or reflected light to a photodetector at 710, and shuttering at least a portion of the field of view using a transmissive liquid crystal (LC) structure at 715. The conveying the scattered or reflected light can include use of a curved concentrator (e.g., a reflecting concentrator) as shown and described in relation to other examples herein. The shuttering can include use and control of an LC structure such as shown and described herein in relation to FIG. 1A, FIG. 1B, FIG. 2A, FIG. 2B, FIG. 3A, FIG. 3B, FIG. 3C, FIG. 4, FIG. 6A, FIG. 6B, or FIG. 6C, or combinations thereof. The technique 700 can include illuminating a field of regard at 705, such as using a beam steerer as shown in FIG. 5 or using one or more other illumination techniques as mentioned in relation to various examples herein. In an example, a transmit/receive scheme can be used combining beam steering by the optical illuminator along with control of EO shutter such as the LC structure, as shown and described in relation to FIG. 5, FIG. 6A, FIG. 6B, or FIG. 6C, or combinations thereof.

Each of the non-limiting aspects in this document can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An optical detection system for use in receiving light scattered or reflected from a field of view, the optical detection system comprising:
   a photodetector;
   a concentrator to convey the scattered or reflected light to the photodetector; and
   a transmissive liquid crystal (LC) structure coupled to a control circuit, the transmissive liquid crystal structure comprising two or more regions having a selectable opacity, the regions adjustable by the control circuit;
   wherein the control circuit is configured to:
      determine a locus amongst the two or more regions of the transmissive LC structure corresponding to an interferer within the field of view by searching for the interferer by rendering opaque one or more regions amongst the two or more regions and, in response, monitoring an output of the photodetector; and
      render one or more regions corresponding to the locus opaque using the transmissive LC structure.

2. The optical detection system of claim 1, wherein the control circuit is configured to suppress illumination of the field of view by the optical detection system during the search.

3. The optical detection system of claim 1, wherein the control circuit is configured to implement the search using a quadtree approach.

4. The optical detection system of claim 1, wherein the concentrator comprises a parabolic reflector.

5. The optical detection system of claim 1, wherein the concentrator comprises a faceted reflector.

6. The optical detection system of claim 1, wherein the photodetector comprises a single-pixel photodetector.

7. The optical system of claim 1, further comprising an illuminator to generate the light to be scattered or reflected.

8. The optical system of claim 7, wherein the illuminator is configured to generate the illumination comprising a one-dimensional (1D) line oriented along a first axis, and to scan the one-dimensional line along a second axis, perpendicular to the first axis; and
   wherein the control circuit is configured to adjust the transmissive LC structure to establish a linear transmissive region oriented parallel to the second axis.

9. The optical system of claim 8, wherein the control circuit is configured to establish a series of parallel transmissive regions oriented parallel to the second axis to effect a pixel-by-pixel scan of the field of view using a combination of the 1D transmitted line and respective parallel transmissive regions.

10. A method for using an optical detection system to receive light scattered or reflected from a field of view, the method comprising:
    conveying scattered or reflected light to a photodetector using a concentrator; and
    shuttering at least a portion of the field of view using a transmissive liquid crystal (LC) structure coupled to a control circuit, the transmissive liquid crystal structure comprising two or more regions having a selectable opacity, the regions adjustable by the control circuit;
    wherein the shuttering comprises:
       automatically determining a locus amongst the two or more regions of the transmissive LC structure corresponding to an interferer within the field of view using the control circuit, including searching for the interferer by rendering opaque one or more regions amongst the two or more regions;

in response, monitoring an output of the photodetector; and rendering one or more regions corresponding to the locus opaque using the transmissive LC structure.

11. The method of claim 10, comprising automatically suppressing illumination of the field of view by the optical detection system during the search.

12. The method of claim 10, comprising generating illumination comprising a one-dimensional (1D) line oriented along a first axis;

scanning the one-dimensional line along a second axis, perpendicular to the first axis; and adjusting the transmissive LC structure to establish a linear transmissive region oriented parallel to the second axis.

13. The method of claim 12, comprising establishing a series of parallel transmissive regions oriented parallel to the second axis to effect a pixel-by-pixel scan of the field of view using a combination of the 1D transmitted line and respective parallel transmissive regions.

14. An optical detection system for use in receiving light scattered or reflected from a field of view, the optical detection system comprising:

a photodetector;

a concentrator to convey the scattered or reflected light to the photodetector;

a transmissive liquid crystal (LC) structure coupled to a control circuit, the transmissive liquid crystal structure comprising two or more regions having a selectable opacity, the regions adjustable by the control; and an illuminator to generate the light to be scattered or reflected, the illuminator configured to generate the illumination comprising a one-dimensional (1D) line oriented along a first axis, and to scan the one-dimensional line along a second axis, perpendicular to the first axis; and wherein the control circuit is configured to adjust the transmissive LC structure to establish a linear transmissive region oriented parallel to the second axis.

15. The optical system of claim 14, wherein the control circuit is configured to establish a series of parallel transmissive regions oriented parallel to the second axis to effect a pixel-by-pixel scan of the field of view using a combination of the 1D transmitted line and respective parallel transmissive regions.

16. The optical detection system of claim 14, wherein the concentrator comprises a parabolic reflector.

17. The optical detection system of claim 14, wherein the concentrator comprises a faceted reflector.

18. The optical detection system of claim 14, wherein the photodetector comprises a single-pixel photodetector.

19. The optical detection system of claim 14, wherein the control circuit is configured to:

determine a locus amongst the two or more regions of the transmissive LC structure corresponding to an interferer within the field of view by searching for the interferer by rendering opaque one or more regions amongst the two or more regions and, in response, monitor an output of the photodetector;

render one or more regions corresponding to the locus opaque using the transmissive LC structure; and suppress illumination of the field of view by the optical detection system during the search.

20. The optical detection system of claim 19, wherein the control circuit is configured to implement the search using a quadtree approach.

* * * * *